US011240467B1

(12) United States Patent
Benson

(10) Patent No.: US 11,240,467 B1
(45) Date of Patent: Feb. 1, 2022

(54) SYSTEM AND METHOD FOR A TIMED ONE-ON-ONE VIDEO CONFERENCE CALL

(71) Applicant: SQQ Inc

(72) Inventor: Dave Benson, Astoria, NY (US)

(73) Assignee: SQQ Inc, Astoria, NY (US)

( * ) Notice: Subject to any disclaimer, the term of this patent is extended or adjusted under 35 U.S.C. 154(b) by 0 days.

(21) Appl. No.: 17/196,687

(22) Filed: Mar. 9, 2021

(51) Int. Cl.
*H04N 7/14* (2006.01)
*G06F 3/14* (2006.01)
*H04L 29/06* (2006.01)

(52) U.S. Cl.
CPC .......... *H04N 7/147* (2013.01); *G06F 3/1454* (2013.01); *H04L 65/403* (2013.01)

(58) Field of Classification Search
CPC . H04N 7/14; H04N 7/15; H04N 7/152; H04L 29/06; G06F 3/14; G04F 1/005; G04F 3/08
USPC ............................................ 348/14.01–14.16
See application file for complete search history.

(56) References Cited

U.S. PATENT DOCUMENTS

| | | | | |
|---|---|---|---|---|
| 8,717,403 B1* | 5/2014 | Kalevo | ................. | H04N 7/15 348/14.02 |
| 2004/0066709 A1* | 4/2004 | Morykwas | ............ | H04N 21/47 368/10 |
| 2005/0243063 A1* | 11/2005 | Mauron | .................. | G04F 1/005 345/159 |
| 2006/0132595 A1* | 6/2006 | Kenoyer | .................. | H04N 7/15 348/14.08 |
| 2015/0006177 A1* | 1/2015 | DeLand | .................. | G10L 21/10 704/251 |
| 2018/0039951 A1* | 2/2018 | Wynn | ...................... | H04N 7/15 |
| 2018/0160074 A1* | 6/2018 | Mercredi | ................ | H04L 51/32 |
| 2019/0364144 A1* | 11/2019 | Stradley | ................ | H04M 3/567 |
| 2020/0036940 A1* | 1/2020 | Jeon | ..................... | H04N 19/467 |

\* cited by examiner

*Primary Examiner* — Melur Ramakrishnaiah
(74) *Attorney, Agent, or Firm* — Meister Seelig & Fein LLP; Seth H. Ostrow, Esq.

(57) ABSTRACT

A computer-implemented method for a timed one-on-one video conference call between a host and a guest, the video conference call presenting a shared conference call interface including a status bar defining a question portion and an answer portion, the computer-implemented method initiating a timer that defined a preset total time for the conference call and updating the status bar to progress through the question portion and the answer portion according to the timer, and a digital curtain that transitions across the shared conference call interface signaling the end of the video conference call when the timer reaches the preset total time.

29 Claims, 6 Drawing Sheets

US 11,240,467 B1

SYSTEM AND METHOD FOR A TIMED ONE-ON-ONE VIDEO CONFERENCE CALL

FIELD

This application relates to a system and method for a timed one-on-one video conference call and, more specifically, to a timed one-on-one video conference call with a timed question period, a timed answer period, and a timed total length for the timed one-on-one video conference call.

BACKGROUND

Companies are experiencing corrosion of culture, a lack of communication, and a decrease in morale due to an abundance of inefficient and unnecessary meetings. Many meetings are meant to substitute for collision meetings that used to occur before working remotely was so prevalent. Collision meetings are unscheduled casual and fast meetings, including water cooler talk, elevator pitches, office pop-ins, desk swing-by, and others. Companies have been experiencing corrosion of culture and communication as a result of remote work. People are finding it harder to talk to each other effectively and collaboratively. Communication is shifting from in-person chats to written communication and scheduled online meetings. This is causing a decrease in morale and mental health and a lack of efficiency, productivity, and collaboration. Spending hours staring at a computer screen is bad enough, but being subjected to long video meetings can be detrimental to physical and mental health. What is needed is a new video conference call system and method that addresses the above-described issues.

SUMMARY

In an effort to address the above-described needs, a system and method for a timed one-on-one video conference call are disclosed. In some embodiments, a computer-implemented method for a timed one-on-one video conference call is provided. The computer implemented method comprising receiving over a communication network a request from a host on a first user device to initiate a timed one-on-one video conference call with a guest on a second user device, the request by the host including identification information for the guest on the second user device, initiating a timed one-on-one video conference call between the host on the first user device and the guest on the second user device, transmitting over the communication network to the host on the first user device and to the guest on the second user device an invitation to participate in the timed one-on-one video conference call initiated in response to the request by the host, receiving over the communication network a response to the invitation from the host on the first user device, transmitting over the communication network a shared lobby interface to be rendered on the first user device of the host, the shared lobby interface comprising a join button and text reciting one or more topical suggestions, receiving over the communication network a response to the invitation from the guest on the second user device, transmitting over the communication network the shared lobby interface to be rendered on the second user device of the guest, the shared lobby interface comprising a join button and text reciting one or more topical suggestions, receiving over the communication network an interaction with the join button from both the host on the first user device and the guest on the second user device, transmitting over the communication network a shared conference call interface to be rendered on both the first user device of the host and the second user device of the guest, the shared conference call interface comprised of a video stream and an audio stream received over the communication network from both the host on the first user device and the guest on the second user device and a timer ribbon, the timer ribbon defining a question portion and an answer portion, initiating a timer to provide a count from zero and up to a total length of time, and updating over the communication network the timer ribbon within the shared conference call interface according to the count of the timer, the first length of time and the second length of time adding up to the total length of time of the timer.

Still, other aspects, features, and advantages of this disclosure may be readily apparent from the following detailed description, as illustrated by several example embodiments. This disclosure may also be capable of other and different embodiments, and its several details may be modified in various respects. Accordingly, the drawings and descriptions are to be regarded as illustrative and not as restrictive.

BRIEF DESCRIPTION OF THE DRAWINGS

The drawings described below are for illustrative purposes only and are not necessarily drawn to scale. The drawings are not intended to limit the scope of the disclosure in any way. Wherever possible, the same or like reference numbers are used throughout the drawings to refer to the same or like parts.

DETAILED DESCRIPTION

As mentioned above, this application relates to a system and method for a timed one-on-one video conference call. The following description is made for the purpose of illustrating the general principles of the invention and should not be taken in a limiting sense.

Figure 1:
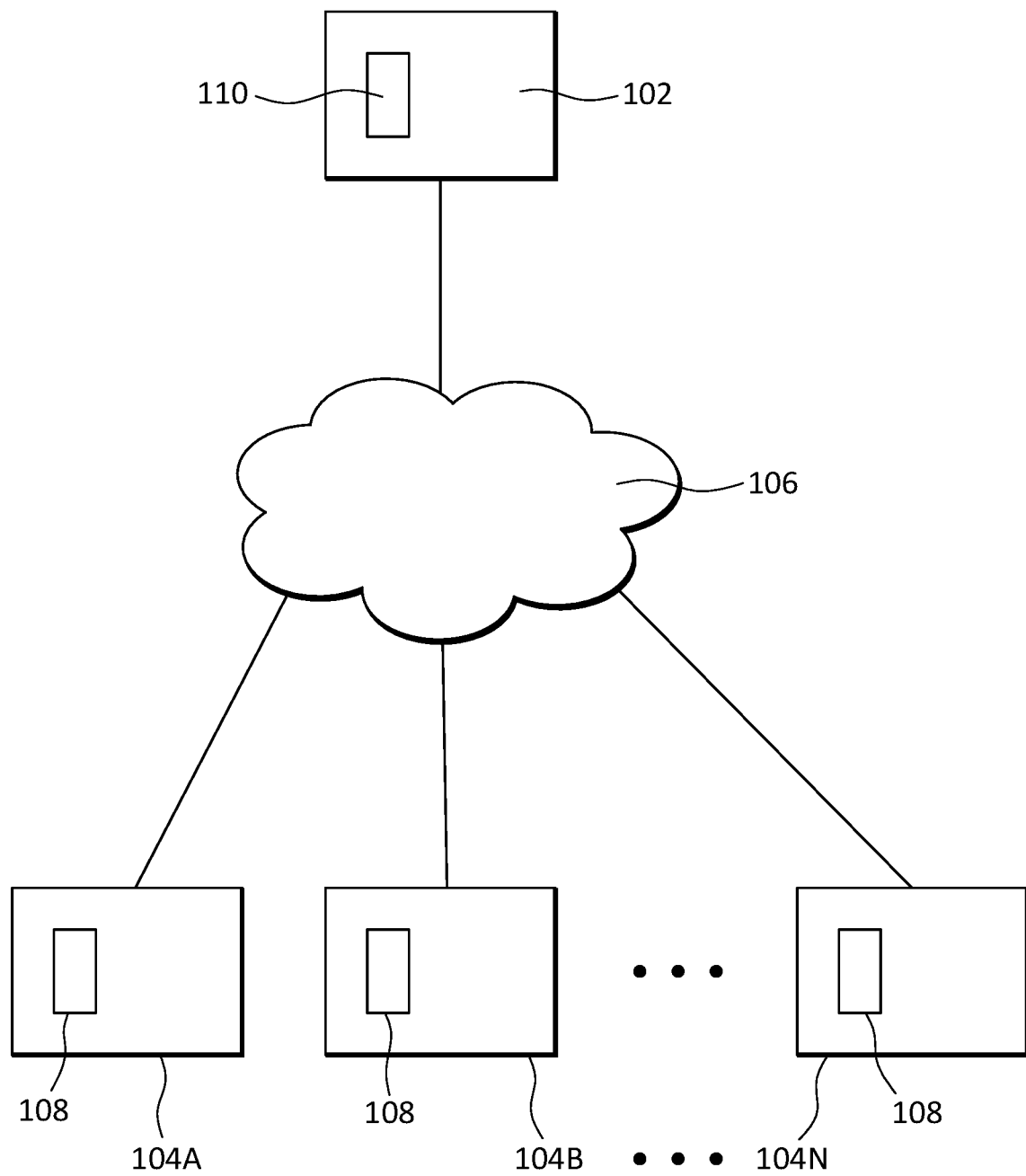
FIG. 1 illustrated an exemplary high-level system architecture for providing a timed one-on-one video conference call according to an implementation disclosed herein.

FIG. 1 illustrated an exemplary high-level system architecture 100 for providing a timed one-on-one video conference call according to an implementation disclosed herein. The system architecture 100 may comprise a communication server 102 connected to user devices 104A-N by a communication network 106. Each of the user devices 104A-N may be capable of implementing a client application 108 for a timed one-on-one video conference call. The client application 108 may provide shared interfaces received from the communication server 102 in which video and audio streams are embedded, the video and audio streams originating from the user devices 104A-N. Specifically, video and audio streams may originate from a first user device 104A of a host and from a second user device 104B of a guest, the host and guest participating in a timed one-on-one video conference call over the communication network 106 as implemented by the communication server 102.

The user devices 104A-N may include a smartphone, tablet, laptop, desktop, palmtop, television, or any other computing device configured to execute the functionality described herein. The user devices 104A-N may have output functionality (e.g., display monitor, touchscreen, speaker, etc.) and input functionality (e.g., touchscreen, keyboard, mouse, camera, microphone, etc.). A camera may provide a video stream on each of the user devices 104A-N, and a microphone may provide an audio stream on each of the user devices 104A-N.

The client application 108 may be a timed one-on-one video conference call client application implemented as a native application, web application, or other software forms. In some implementations, the client application 108 is in the form of a web page, widget, and/or Java, JavaScript, and/or other applet or plug-in that is downloadable to each of the user devices 104A-N and runs in conjunction with a web browser. The client application 108 and the web browser can be part of a single client-server interface; for example, the client application 108 can be implemented as a plugin to the web browser or another framework or operating system. Any other suitable client software architecture, including but not limited to a widget framework and applet technology, can also be employed.

The communication server 102 may be capable of implementing a server side application 110 for a timed one-on-one video conference call that includes sharing interfaces with embedded video and audio streams received from the user devices 104A-N.

The communication server 102 may be embodied as a computer or computers as reasonably known in the art. The communication server 102 may receive and transmit electronic data from various sources, including but not limited to the user devices 104A-N.

For example, the communication server 102 may be operable to receive and post or transmit shared interfaces with embedded video and audio streams originating from the client devices 104. The server side application 110 may also provide for a conference call timer that enables the differentiation between different portions of a conference call and the determination of a total length of a conference call. The server side application 110 may update the shared interfaces based on the status of the conference call timer.

The user devices 104A-N, the communication server 102, and/or other devices and servers may communicate with each other through the communication network 106. Transmissions over the communication network 106 can take place via any media such as standard telephone lines, LAN or WAN links (e.g., T1, T3, 56 kb, X.25), and broadband connections (ISDN, Frame Relay, ATM), wireless links (802.11, Bluetooth, GSM, CDMA, etc.). The communication network 106 can carry TCP/IP protocol communications and HTTP/HTTPS requests made by a web browser, and the connection between clients and servers can be communicated over such TCP/IP networks. The type of communication network is not limited, however, and any suitable network can be used.

More generally, the techniques described herein can be implemented in any suitable hardware or software. If implemented as software, the processes can be executed on a system capable of running one or more custom operating systems or any commercially available operating system. The software can be implemented on a computer, including a processor unit, system memory, and a system bus that interconnects various components, including the system memory to the processing unit.

The system can include a plurality of software modules stored in a memory and executed on one or more processors. The modules can be in the form of a suitable programming language, which is converted to machine language or object code to allow the processor or processors to read the instructions. The software can be in the form of a standalone application, implemented in any suitable programming language or framework.

Method steps of the techniques described herein can be performed by one or more programmable processors executing a computer program to perform functions of the invention by operating on input data and generating output. An apparatus of the invention can also perform method steps implemented as a particular purpose logic circuitry, including, as an example, a field-programmable gate array (FPGA) or an application-specific integrated circuit (ASIC). Modules can refer to portions of the computer program and/or the processor/special circuitry that implements that functionality.

Processors suitable for executing a computer program include, by way of example, both general and special purpose microprocessors and any one or more processors of any digital computer. Generally, a processor will receive instructions and data from a read-only memory or a random-access memory, or both. The essential elements of a computer are a processor for executing instructions and one or more memory devices for storing instructions and data. Information carriers suitable for embodying computer program instructions and data include all forms on non-volatile memory, including by way of example semiconductor memory devices, e.g., EPROM, EEPROM, and flash memory devices; magnetic disks, e.g., internal hard disks or removable disks; magnetic disks, e.g., internal hard disks or removable disks; magnetic-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file form. The program file can then be stored on or in one of the articles of manufacture.

Figure 2:
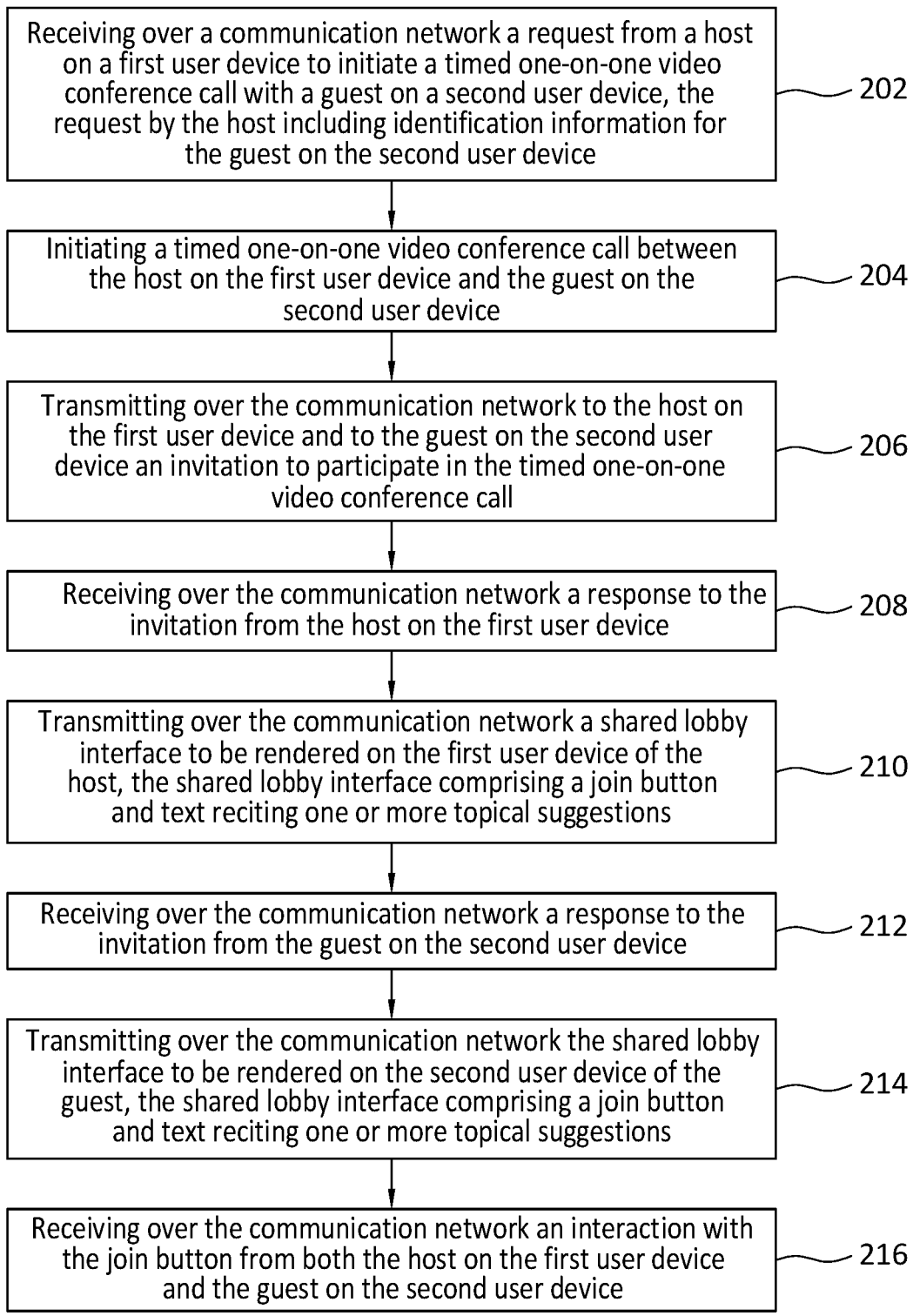
FIG. 2 is a flowchart of a computer-implemented application that provides for a timed one-on-one video conference call according to an implementation disclosed herein.
Figure 2:
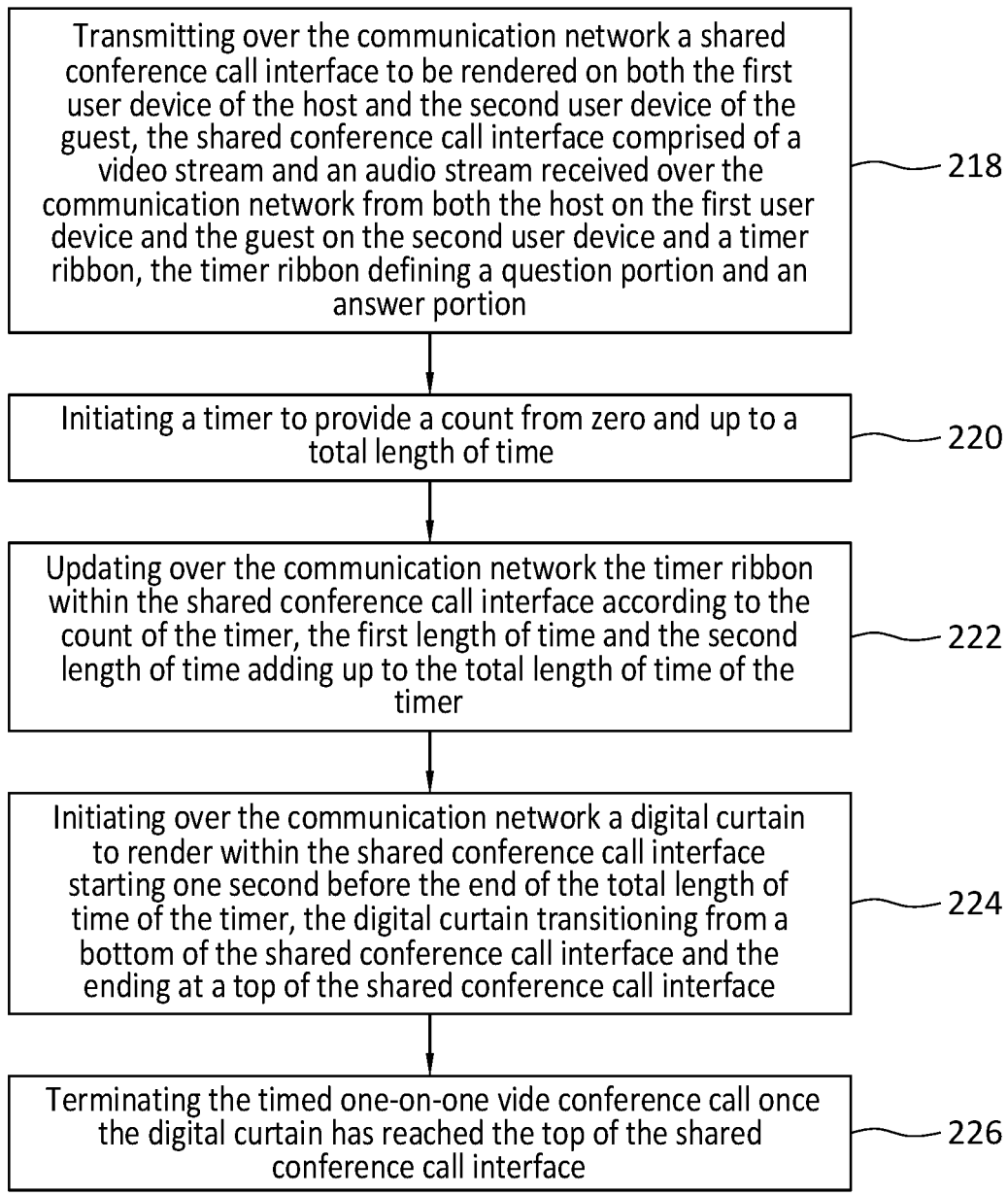

FIG. 2 is a flowchart of a computer-implemented application that provides for a timed one-on-one video conference call according to an implementation disclosed herein.

The method 200 begins at step 202 with receiving over a communication network 106 a request from a host on a first user device 104A to initiate a timed one-on-one video conference call with a guest on a second user device 104B, the request by the host including identification information for the guest on the second user device 104B.

The identification information of the guest on the second user device 104B may include a name, email address, username, phone number, or any other identifying information reasonably known to one of ordinary skill in the art. The identification information may also have been previously gathered and stored on the communication server 102.

Once the request has been received over the communication network 106 from the host on the first user device 104A, the method 200 continues in step 204 with initiating a timed one-on-one video conference call between the host on the first user device 104A and the guest on the second user device 104B.

Prior to initiating the timed one-on-one video conference call, authentication on the communication server 102 of the host on the first user device 104A, the guest on the second user device 104B, or both may be required. This authentication may be implemented on the communication server 102 by any means reasonably known to one of ordinary skill in the art.

Once the timed one-on-one video conference call has been initiated on the communication server 106, the method 200 continues in step 206 with transmitting over the communication network 106 to the host on the first user device 104A and to the guest on the second user device 104B an invitation to participate in the timed one-on-one video conference call.

In an exemplary implementation, the invitation may include a link that will link the first user device 104A and the second user device 104B to the timed one-on-one video conference call over the communication network 106 when engaged by the user and the guest.

Once the invitations have been transmitted over the communication network 106, the method 200 continues in step 208 with receiving over the communication network 106 a response to the invitation from the host on the first user device 104A.

In an exemplary implementation, the received responses may be in response to the host engaging a link included in the invitation received on the first user device 104A.

Once the response from the host has been received over the communication network 106, the method 200 continues in step 210 with transmitting over the communication network 106 a shared lobby interface to be rendered on the first user device 104A of the host, the shared lobby interface comprising a join button and text reciting one or more topical suggestions.

The method 200 continues in step 212 with receiving over the communication network 106 a response to the invitation from the guest on the second user device 104B.

In an exemplary implementation, the received responses may be in response to the guest engaging a link included in the invitation received on the second user device 104B.

Once the response from the guest has been received over the communication network 106, the method 200 continues in step 214 with transmitting over the communication network 106 a shared lobby interface to be rendered on the second user device 104B of the guest, the shared lobby interface comprising a join button and text reciting one or more topical suggestions.

The method 200 continues in step 216 with receiving over the communication network 106 an interaction with the join button from both the host on the first user device 104A and the guest on the second user device 104B.

The join button provides a means for the host on the first user device 104A and the guest on the second user device 104B to interact with the communication server 102 from within the shared lobby interface. An interaction by the host or the guest with the communication server 102 using the join button signals over the communication network 106 their respective participation in the timed one-on-one video conference call.

The one or more topical suggestions may be selected randomly from a plurality of topical suggestions stored on the communication server 102, each of the plurality of topical suggestions relating to time management suggestions.

The shared lobby interface also provides for the selection of a video source and an audio source on each of the user devices 102A-N. Specifically, the shared lobby interface provides for the host to select a camera source and an audio source on the first user device 104A that will provide for a video stream and an audio stream to be used within the timed one-on-one video conference call. Similarly, the shared lobby interface allows the guest to select a camera source and an audio source on the second user device 104B that will provide for a video stream and an audio stream to be used within the timed one-on-one video conference call.

Once an interaction with the join button is received over the communication network 106 from both the host and the guest, the method 200 continued in step 218 with transmitting over the communication network 106 a shared conference call interface to be rendered on both the first user device 104A of the host and the second user device 104B of the guest, the shared conference call interface comprised of a video stream and an audio stream received over the communication network 106 from both the host on the first user device 104A and the guest on the second user device 104B and a timer ribbon, the timer ribbon defining a question portion and an answer portion.

The method 200 continues in step 220 with initiating a timer to provide a count from zero and up to a total length of time.

Once the timer has started, the method 200 continues in step 222 with updating over the communication network 106 the timer ribbon within the shared conference call interface according to the count of the timer, the timer ribbon indicating a question period for a first length of time and an answer period for a second length of time, the first length of time and the second length of time adding up to the total length of time of the timer.

The method 200 continues in step 224 with initiating over the communication network 106 a digital curtain to render within the shared conference call interface starting at the end of the total length of time of the timer, the digital curtain transitioning from a bottom of the shared conference call interface and the ending at a top of the shared conference call interface.

The method 200 ends in step 226 with terminating the timed one-on-one video conference call once the digital curtain has reached the top of the shared conference call interface.

Figure 3:
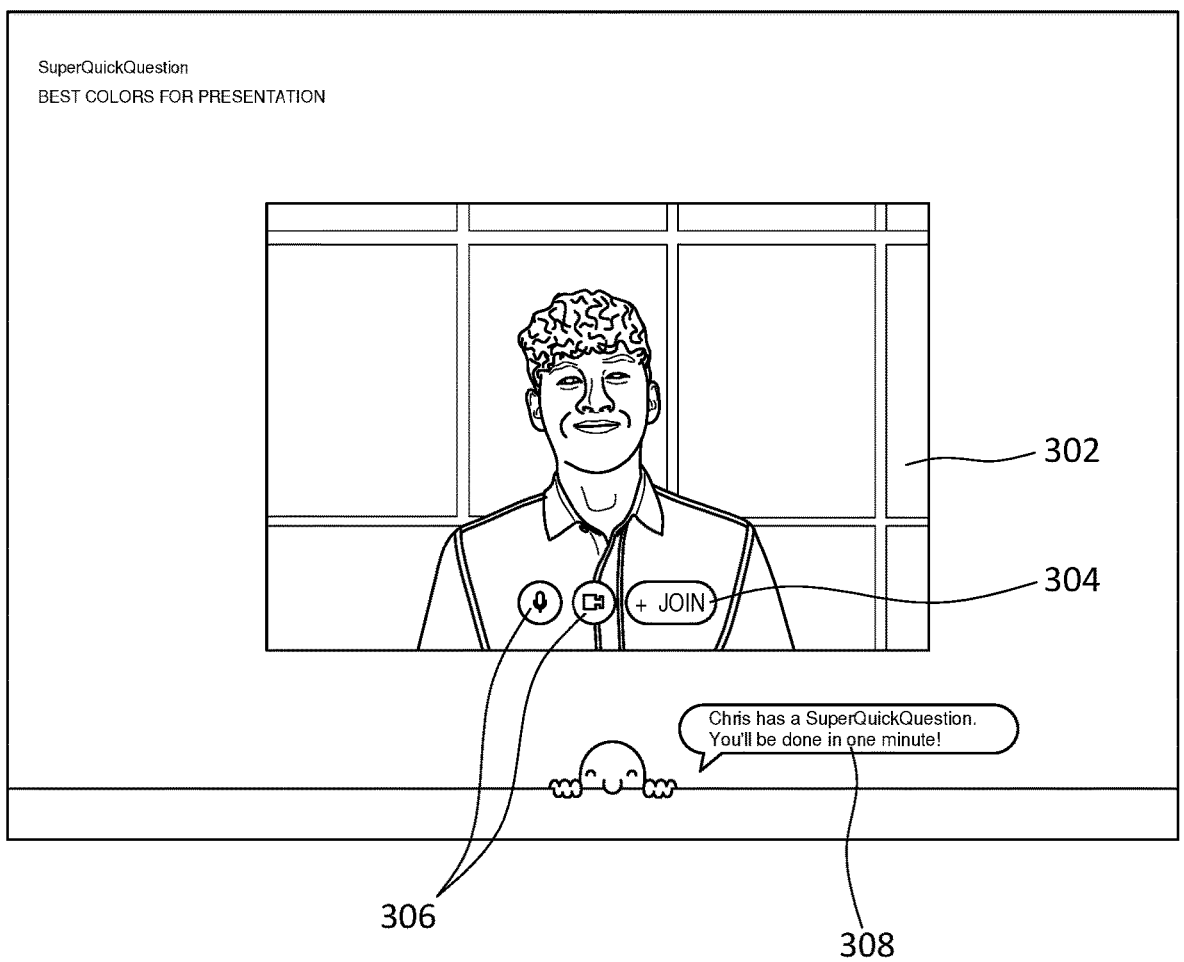
FIG. 3 illustrates an exemplary shared lobby interface for a timed one-on-one video conference call according to an implementation disclosed herein.

FIG. 3 illustrates an exemplary shared lobby interface 300 for a timed one-on-one video conference call according to an implementation disclosed herein. The shared lobby interface 300 may include a video window 302, a join button 304, video and audio source buttons 306, and text reciting one or more topical suggestions 308.

The video window 302 may display a video stream originating from either the first user device 102A, a video stream originating from the second user device 102B, or a predetermined image file.

As discussed above, the join button 304 may provide for interaction over the communication network 106 by the host on the first user device 102A or the guest on the second user device 102B with the communication server 102 signaling their respective participation in the timed one-on-one video conference call.

The video and audio source buttons 306 provided for selecting a video source and an audio source on the first user device 102A and the second user device 102B.

The text reciting one or more topical suggestions 308 may be selected randomly from a plurality of topical suggestions stored on the communication server 102.

Figure 4:
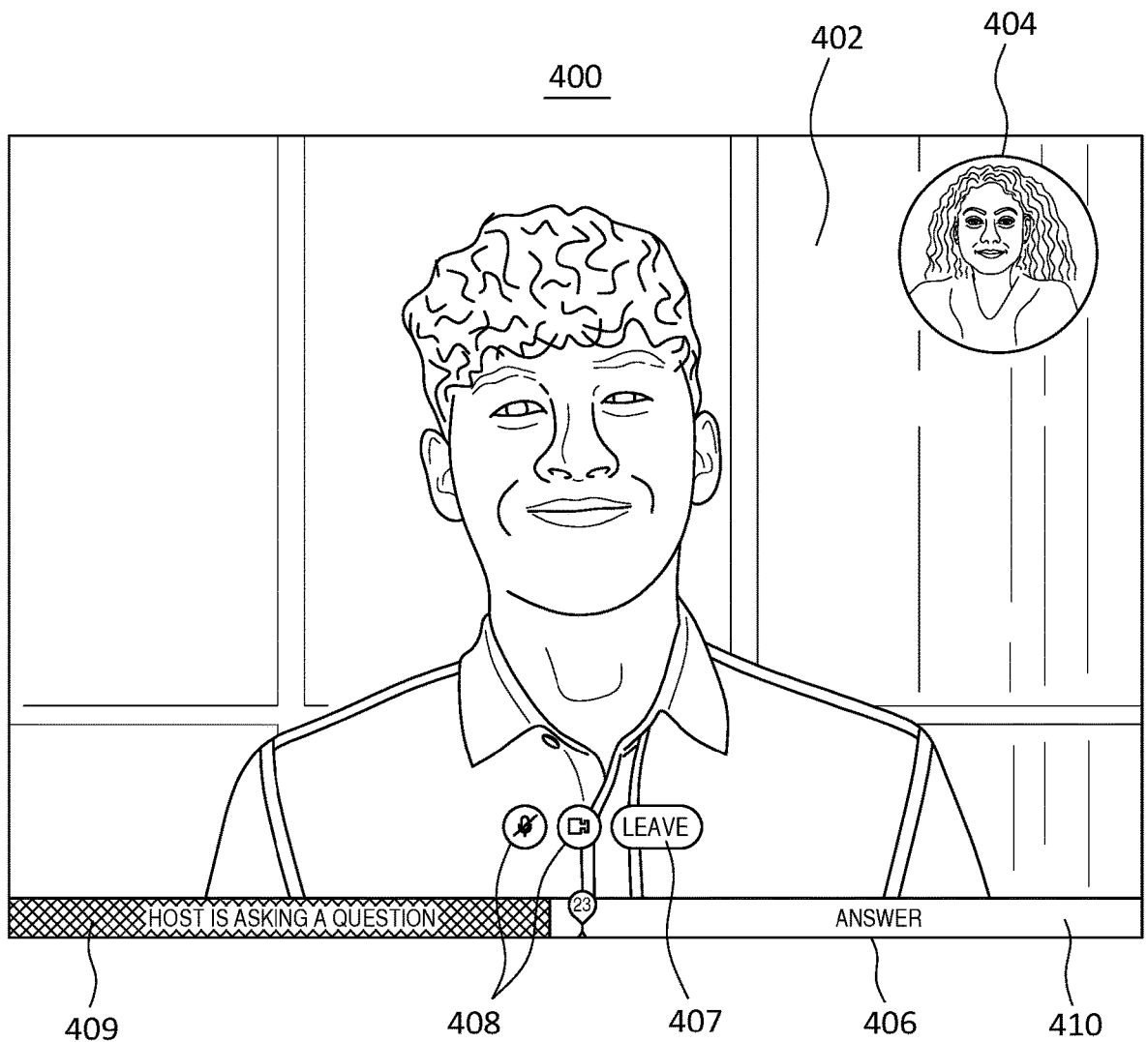
FIG. 4 illustrates an exemplary shared conference call interface for a timed one-on-one video conference call according to an implementation disclosed herein.

FIG. 4 illustrates an exemplary shared conference call interface 400 for a timed one-on-one video conference call according to an implementation disclosed herein. The shared conference call interface 400 may include a host video window 402, a guest video window 404, a timer ribbon 406, a leave button 407, and video and audio source buttons 408.

The host video window 402 displays the video stream and plays the audio stream originating from the first user device 102A of the host. Similarly, the guest video window 404 displays the video stream and plays the audio stream originating from the second user device 102B of the guest.

The timer ribbon 406 provides a visual display of the timer count up to a total length of time. The timer ribbon 406 may be divided into a question portion 409 and an answer portion 410. While the timer is in the question portion 409, the host video window 402 may be sized to encompass the majority of the shared conference call interface 400 while the guest video window 404 may be sized to encompass a minority of the shared conference call interface 400. Alternatively, while the timer is in the answer portion 410, the guest video window 404 may be sized to encompass the majority of the shared conference call interface 400 while the host video window 402 may be sized to encompass a minority of the shared conference call interface 400.

The leave button 407 may provide for interaction over the communication network 106 by the host on the first user device 102A or the guest on the second user device 102B with the communication server 102 signaling their respective termination of the timed one-on-one video conference call.

As described above, the video and audio source buttons 408 provide for selecting a video source and an audio source on each of the first user device 102A and the second user device 102B.

Figure 5:
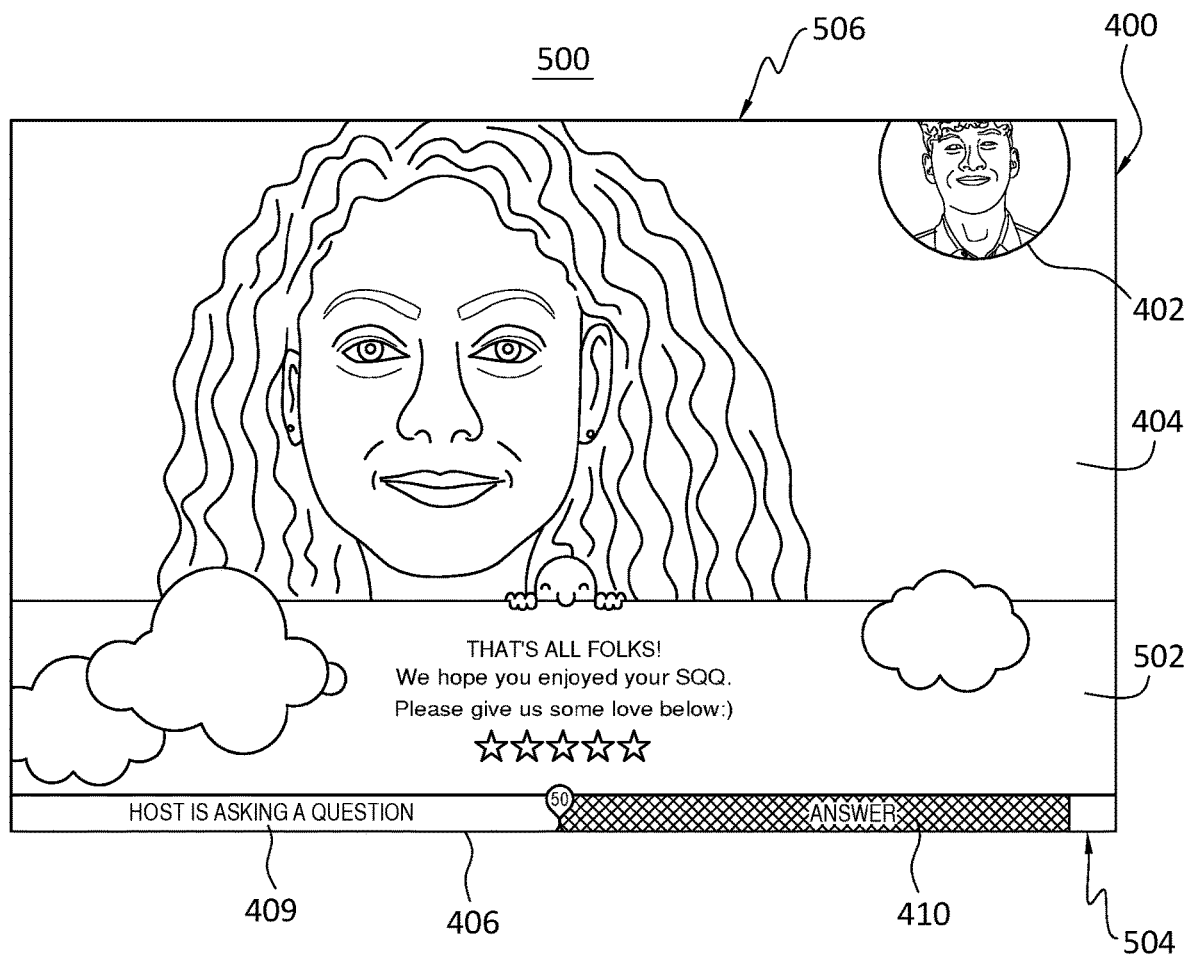
FIG. 5 illustrates an exemplary digital curtain within a shared conference call interface for a timed one-on-one video conference call according to an implementation disclosed herein.

FIG. 5 illustrates an exemplary digital curtain 502 within a shared conference call interface 400 for a timed one-on-one video conference call according to an implementation disclosed herein. The digital curtain 502 begins a transition from a bottom portion 504 of the shared conference call interface 400 to a top portion 506 of the shared conference call interface 400. The transition begins at the end of the answer portion 410 of the timer ribbon 406.

The foregoing description discloses only example embodiments. Modifications of the above-disclosed assemblies and methods which fall within the scope of this disclosure will be readily apparent to those of ordinary skill in the art.

This disclosure is not intended to limit the invention to the particular assemblies and/or methods disclosed, but, to the contrary, the intention is to cover all modifications, equivalents, and alternatives falling within the scope of the claims.

What is claimed is:

1. A computer-implemented method for a timed one-on-one video conference call, the method comprising:
   receiving over a communication network a request from a host on a first user device to initiate a timed one-on-one video conference call with a guest on a second user device, the request by the host including identification information for the guest on the second user device;
   initiating a timed one-on-one video conference call between the host on the first user device and the guest on the second user device;
   transmitting over the communication network to the host on the first user device and to the guest on the second user device an invitation to participate in the timed one-on-one video conference call initiated in response to the request by the host;
   receiving over the communication network a response to the invitation from the host on the first user device;
   transmitting over the communication network a shared lobby interface to be rendered on the first user device of the host, the shared lobby interface comprising a join button and text reciting one or more topical suggestions;
   receiving over the communication network a response to the invitation from the guest on the second user device;
   transmitting over the communication network the shared lobby interface to be rendered on the second user device of the guest, the shared lobby interface comprising a join button and text reciting one or more topical suggestions;
   receiving over the communication network an interaction with the join button from both the host on the first user device and the guest on the second user device;
   transmitting over the communication network a shared conference call interface rendered on both the first user device of the host and the second user device of the guest, the shared conference call interface including a video stream and an audio stream received over the communication network from both the host on the first user device and the guest on the second user device, and the shared conference call interface including a timer ribbon, the timer ribbon including a question portion indicator corresponding to a first length of time and an answer portion indicator corresponding to a second length of time;
   initiating a timer to provide a count from zero and up to a total length of time; and
   updating over the communication network the timer ribbon within the shared conference call interface according to the count of the timer, the first length of time and the second length of time adding up to the total length of time of the timer.

2. The computer-implemented method for a timed one-on-one video conference call of claim 1, the method further comprising initiating over the communication network a digital curtain to render within the shared conference call interface starting at an end of the total length of time of the timer, the digital curtain transitioning from a bottom of the shared conference call interface and ending at a top of the shared conference call interface; and
   terminating the timed one-on-one video conference call once the digital curtain has reached the top of the shared conference call interface.

3. The computer-implemented method for a timed one-on-one video conference call of claim 1, wherein the shared lobby interface further comprising video and audio source buttons.

4. The computer-implemented method for a timed one-on-one video conference call of claim 1, wherein the shared conference call interface further comprising a leave button and video and audio source buttons.

5. A computer-implemented method for a timed video call, the method comprising:

receiving over a communication network a request from a host on a first user device to initiate a timed video call with a guest on a second user device;

transmitting over the communication network to the guest on the second user device an invitation to participate in the timed video call;

receiving over the communication network a command to join the timed video call from the host on the first user device and the guest on the second user device;

streaming video and audio between the host on the first user device and the guest on the second user device, the streamed video and audio rendered on a call interface on the first user device of the host and on the second user device of the guest, the call interface comprising a timer including a question portion indicator corresponding to a first length of time and an answer portion indicator corresponding to a second length of time, and wherein a digital curtain is rendered on the first user device and the second user device at an end of a total of the first and second lengths of time, the digital curtain rendered to transition from a first position to a second position; and terminating the timed video call upon rendering of the digital curtain to the second position.

6. The computer-implemented method of claim 5 wherein the request includes identification information of the guest.

7. The computer-implemented method of claim 5 wherein the identification information includes at least one of a name, email address, username, and phone number.

8. The computer-implemented method of claim 5 wherein the call interface comprises a join button and text including one or more topical suggestions.

9. The computer-implemented method of claim 5 wherein the call interface includes functionality for selecting a camera source and an audio source providing a video stream and an audio stream used within the timed video call.

10. The computer-implemented method of claim 5 wherein the call interface includes a host video window that displays a video stream originating from the first user device and a guest video window that displays a video stream originating from the second user device.

11. The computer-implemented method of claim 10 wherein the host video window is sized to encompass a majority of the call interface and the guest video window is sized to encompass a minority of the call interface during the question portion corresponding to the first length of time on the timer.

12. The computer-implemented method of claim 10 wherein the guest video window is sized to encompass a majority of the call interface and the host video window is sized to encompass a minority of the call interface during the answer portion corresponding to the second length of time on the timer.

13. The computer-implemented method of claim 5 wherein the total of the first and second lengths of time comprises a minute.

14. A computer-implemented method for a timed video call, the method comprising:

receiving over a communication network a request from a host on a first user device to initiate a timed video call with a guest on a second user device;

transmitting over the communication network to the guest on the second user device an invitation to participate in the timed video call;

receiving over the communication network a command to join the timed video call from the host on the first user device and the guest on the second user device; and streaming video and audio between the host on the first user device and the guest on the second user device, the streamed video and audio rendered on a call interface on the first user device of the host and on the second user device of the guest, the call interface comprising a timer ribbon including a question portion indicator corresponding to a first length of time and an answer portion indicator corresponding to a second length of time.

15. The computer-implemented method of claim 14 wherein the request includes identification information of the guest.

16. The computer-implemented method of claim 14 wherein the identification information includes at least one of a name, email address, username, and phone number.

17. The computer-implemented method of claim 14 wherein the call interface comprises a join button and text including one or more topical suggestions.

18. The computer-implemented method of claim 14 wherein the call interface includes functionality for selecting a camera source and an audio source providing for a video stream and an audio stream used within the timed video call.

19. The computer-implemented method of claim 14 wherein the call interface includes a host video window that displays a video stream originating from the first user device and a guest video window that displays a video stream originating from the second user device.

20. The computer-implemented method of claim 19 wherein the host video window is sized to encompass a majority of the call interface and the guest video window is sized to encompass a minority of the call interface during the question portion corresponding to the first length of time on the timer.

21. The computer-implemented method of claim 19 wherein the guest video window is sized to encompass a majority of the call interface and the host video window is sized to encompass a minority of the call interface during the answer portion corresponding to the second length of time on the timer.

22. The computer-implemented method of claim 14 wherein a total of the first length of time and the second length of time comprises a minute.

23. A communication server for facilitating a timed video call, the communication server comprising:

a processor; and a memory having executable instructions stored thereon that when executed by the processor cause the processor to:

receive over a communication network a request from a host on a first user device to initiate a timed video call with a guest on a second user device;

transmit over the communication network to the guest on the second user device an invitation to participate in the timed video call;

receive over the communication network a command to join the timed video call from the host on the first user device and the guest on the second user device; and stream video and audio between the host on the first user device and the guest on the second user device, the streamed video and audio rendered on a call interface on the first user device of the host and on the second user device of the guest, the call interface comprising a timer ribbon including a question portion indicator corresponding to a first length of time and an answer portion indicator corresponding to a second length of time.

24. A method, in a data processing system comprising a processor and a memory, for facilitating a timed video call, the method comprising:
- requesting, by a first user device over a communication network, a timed one-on-one video call between a host on the first user device and a guest on a second user device;
- receiving, by the first user device over the communication network, a response to the request from the guest on the second user device;
- exchanging, by the first user device over the communication network, streaming video and audio with the guest on the second user device, the streamed video and audio rendered on a call interface on the first user device of the host and on the second user device of the guest;
- rendering, by the first user device, on the call interface a timer ribbon including a question portion indicator corresponding to a first length of time and an answer portion indicator corresponding to a second length of time;
- rendering, by the first user device, a digital curtain on the first user device at an end of a total of the first and second lengths of time, the digital curtain rendered to transition from a first position to a second position; and
- terminating the timed video call upon rendering of the digital curtain to the second position.

25. The method of claim 24 further comprising rendering a lobby interface comprising a join button and text reciting one or more topical suggestions.

26. The method of claim 24 further comprising:
- initiating a timer to provide a count from zero and up to a total length of time; and
- updating over the communication network the timer ribbon within the shared call interface according to the count of the timer.

27. The method of claim 24 wherein the call interface includes a host video window that displays a video stream originating from the first user device and a guest video window that displays a video stream originating from the second user device.

28. The method of claim 27 wherein the host video window is sized to encompass a majority of the call interface and the guest video window is sized to encompass a minority of the call interface during the question portion corresponding to the first length of time on the timer.

29. The method of claim 27 wherein the guest video window is sized to encompass a majority of the call interface and the host video window is sized to encompass a minority of the call interface during the answer portion corresponding to the second length of time on the timer.

* * * * *